United States Patent [19]

Nakagawa et al.

[11] 4,204,763
[45] May 27, 1980

[54] EXPOSURE TIME SETTING DEVICE FOR SHUTTER OF CAMERA

[75] Inventors: Tadashi Nakagawa; Mitsuo Koyama; Ichiro Nemoto, all of Shikawatashi, Japan

[73] Assignee: Seiko Koki Kabushiki Kaisha, Japan

[21] Appl. No.: 924,088

[22] Filed: Jul. 12, 1978

[30] Foreign Application Priority Data

Jul. 15, 1977 [JP] Japan .............................. 52-95055[U]

[51] Int. Cl.² .......................... G03B 17/38; G03B 9/64
[52] U.S. Cl. ..................................... 354/267; 354/239
[58] Field of Search ............... 354/266, 267, 288, 289, 354/234-252

[56] References Cited

U.S. PATENT DOCUMENTS 4,096,503   6/1978   Sato .................................. 354/424 X

FOREIGN PATENT DOCUMENTS 1167647   8/1958   France ..................................... 354/247
44735   12/1967   German Democratic Rep. ..... 354/241

Primary Examiner—Donald A. Griffin
Attorney, Agent, or Firm—Robert E. Burns; Emmanuel J. Labato; Bruce L. Adams

[57] ABSTRACT

An exposure time setting device is provided for effecting the exposure time for the shutter in response to the dial position of an exposure time setting dial disposed on an upper surface of a camera and movable in an operating plane. The device is provided with a control mechanism movable in a given plane perpendicular to the operating plane for opening and closing the shutter, a governor mechanism movable in the given plane for delaying operation of the control mechanism and an exposure time setting cam movable, in response to movement of the dial, within a plane parallel to the operating plane and perpendicular to the given plane.

3 Claims, 6 Drawing Figures

EXPOSURE TIME SETTING DEVICE FOR SHUTTER OF CAMERA

BACKGROUND OF THE INVENTION

This invention is concerned with improvement of an exposure time setting device for the shutter of a camera and is particularly related to an exposure time setting device for the shutter of a small-sized camera.

In taking a photograph, it is a usual procedure to set the film sensitivity, shutter speed and aperture first, then secondly to work on focusing. Focusing work is most frequently made.

In most cases the aperture setting means and the focusing means are provided adjacent to the lens due to constructional reasons, however, there is the possibility of unduly dislocating the settings during focusing when the operating means for the settings are arranged adjacent to the operating means for focusing. Furthermore, concentration of those operating means on the lens unit has the disadvantage that the lens cylinder or unit becomes large-sized. In a monocular reflex camera provided with a focal-plane shutter, the shutter speed and the film sensitivity setting means necessarily are disposed in the body of a camera independent of the lens unit because the lenses are frequently interchanged.

In constructing a camera smaller and more compact, there must be only the least setting means provided on the lens unit. It is desirable to arrange the operating unit for film sensitivity setting and shutter speed setting device on the upper face or on the front face except the lens unit mounting area of the body of a camera.

This invention provides an exposure time setting device for the shutter to be mounted on a camera having an operating unit for exposure time setting device on the upper face of the body of a camera according to the constructional requirement of a small-sized camera.

According to this invention, the exposure time adjusting mechanism is disposed so as to be easily interlocked with the operation of the operating unit for the exposure time setting device provided on the upper face of the body of a camera.

When a camera is produced by fitting the shutter unit assembly on the body assembly, there is an advantage that each component assembly is manufactured through a separate manufacturing process so that the assembling and adjusting process is improved and the manufacturing cost is reduced while the performance and the stabilized quality of the shutter are maintained independently of the body unit as the component parts of the shutter unit are engaged with each other within the shutter unit assembly.

On the other hand, there is a difficulty in interlocking the shutter unit assembly for a small-sized camera with the operating unit disposed on the upper face of the body of a camera because the constituent members of the shutter unit work in a plane vertical against the upper face of the body of the camera.

In the conventional camera having this type of shutter unit including an exposure time setting device provided in a plane parallel to the plane in which the constituent members of the shutter unit work, the exposure time setting device and its operating means have been interlocked by means of gears, chains, string and the like converting the motion of the operating means into the motion of the exposure time setting device in the vertical plane against the plane of the motion of the operating means. This method has the disadvantage that it requires such means for converting the direction of motion of members as mentioned above and also an additional adjusting means for compensating for the error of the converting means.

SUMMARY OF THE INVENTION

An object of the invention is to simplify the construction of a camera by disposing the exposure time setting device of a shutter in a plane parallel to the operating unit on the upper face of the camera and facilitating the engagement between the exposure time setting device and the operating unit.

An embodiment of the invention will now be described with reference to the accompanying drawings.

BRIEF EXPLANATION OF THE DRAWINGS

The drawings illustrate one embodiment of the invention, in which.

DETAILED DESCRIPTION OF THE INVENTION

Figure 1:
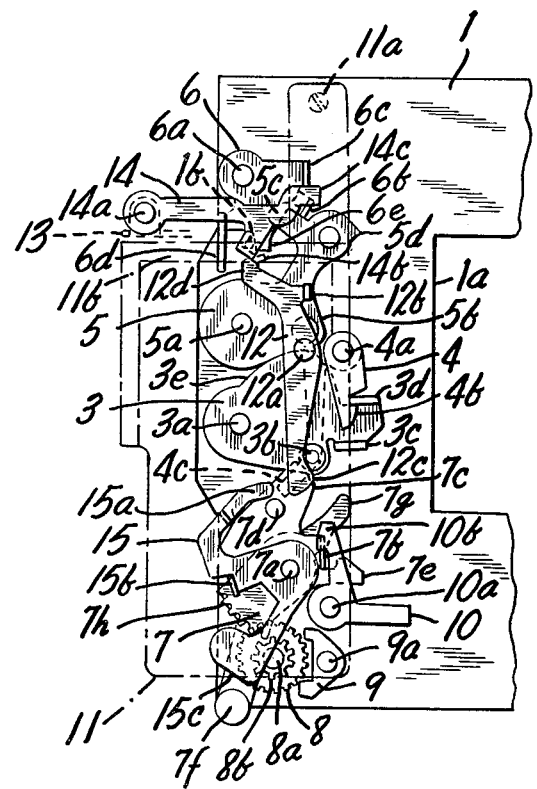
FIG. 1 is a plan view in the charged state of the shutter.

Referring to FIG. 1, a shutter base plate 1 is formed with a shutter opening 1a for exposure and is covered with opening blade means not shown. Also, closing blade means (not shown) is accommodated in an upper edge portion of the opening 1a and ready for ending the exposure. Each of the blade means is supported such that it can operate within a plane parallel to a plate member 2 of the same shape as the shutter base plate 1 and extending parallel thereto.

An opening member 3 is pivoted by a shaft 3a to the base plate 1, and it is biased for clockwise rotation by a spring (not shown). The opening member 3 is provided on its right side portion with a two-state protuberance for charging, upwardly projecting bent portions 3c and 3d, a cam portion 3e formed on an upper outer periphery and a lower protuberance (not shown) operably coupled to the opening blade means, with the bent portion 3d engaged with a hook 4b of an opening pawl 4.

The opening pawl 4 is mounted by a shaft 4a on the base plate 1 and is rotatably supported with counterclockwise bias torque provided by a spring (not shown). Further, the opening pawl 4 is intergral with a downwardly extending arm 4c.

A closing member 5 is rotatably mounted by a shaft 5a on the base plate 1 and is biased for clockwise rotation by a spring (not shown). The closing member 5 is provided on its right side portion with an upper protuberance 5b for charging, a hook 5c and a lower protuberance 5d operably coupled to the closing blade means, with the hook 5c in engagement with a bent portion 6b of the closing pawl 6.

The closing pawl 6 is mounted by a shaft 6a on the base plate 1 and is rotatably supported with counterclockwise torque provided by a spring (not shown). It is provided with two, upwardly projecting bent portions 6c and 6d and a convex portion 6e engaging a projection 1b projecting from the base plate 1.

An operating member 7 is pivoted by a shaft 7a to the base plate 1 and is biased for counterclockwise rotation by a spring (not shown). The operating member 7 is provided with an upwardly projecting engagement bent portion 7b, a cam portion 7c engaging with the two-stage protuberance 3b of the opening member 3, a hook 7e engaging with the bent portion 3c of the opening member 3, a protuberance 7f for charging engaging with a winding member of the camera and protuberance 7g and gear portion 7h formed under and integral with it.

The gear portion 7h is in mesh with a small gear 8b in a zigzag wheel 8, which is pivoted by a shaft 8a to the base plate 1, and the rotation of which is controlled by an ankle 9 similarly pivoted to the base plate 1 by a shaft 9a.

A release lever 10 is pivoted by a shaft 10a to the base plate 1, and it is biased for counterclockwise rotation by a spring (not shown). It is provided at its tip with a hook 10b in engagement with the bent portion 7b of the operating member 7.

A control base plate 11 made of a synthetic resin or the like is provided such as to cover the afore-mentioned individual members as indicated by the broken line and is mounted on the base plate 1 by means of a screw 11a and a well-known method not shown. The control base plate 11 is formed with an escapement portion, which is penetrated by the shafts 3a, 5a, 7a and 10a and also by the two-state protuberance 3b and pin 7d, and is also formed with an upper channel-shaped protuberance 11b.

An interlock lever 12 is pivoted by a shaft 12a to the back side of the control base plate 11, with its bent portion 12b acted upon by a spring (not shown) for clockwise rotation. It is also provided with a cam arm 12c projecting into an operating region of the two-stage protuberance 3b of the opening member 3 and also with an operating protuberance 12d formed at the other end.

An adjustment lever 13 is slidably supported on the channel-shaped protuberance 11b of the control base plate 11 for movement in the transverse directions in a plane normal to the base plate 1 and is biased in the rightward direction by a spring (not shown).

A fulcrum lever 14 is pivoted by a shaft 14a to an adjustment lever 13 and is provided with a bent portion 14b engaging with the operating protuberance 12b of the interlock lever 12 and an arm 14c engaging with the bent portion 6c of the closing pawl 6.

An engagement pawl 15 is inserted into a portion where the shaft 7a of the operating member 7 penetrates and projects from the control base plate 11, and it is rotatably supported with counterclockwise bias provided by a spring (not shown). It is provided with an arm 15a engaging with the two-stage protuberance 3b of the opening member 3, an engagement bent portion 15b and a contact arm 15c extending to the other end.

Figure 2:
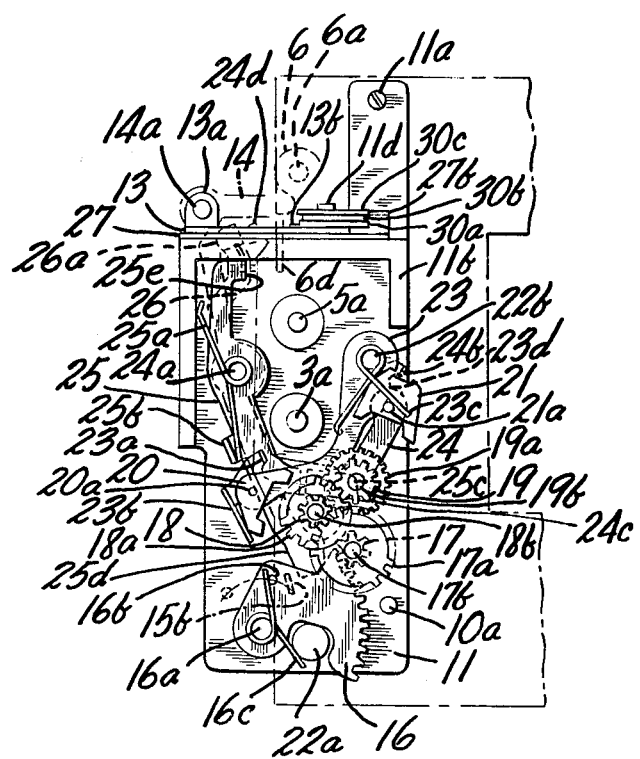
FIG. 2 is a plan view showing a control section disposed on the mechanism of FIG. 1 and in the charged state.

FIG. 2 shows a control mechanism arranged on top of the individual parts in the charged state in FIG. 1 in correspondence to the charged state.

A delaying means consisting of a gear train for controlling the exposure period comprises a sector-shaped first wheel 16, a small gear 17 in mesh therewith, a gear 17a integral with the small gear 17, a small gear 18 in mesh with the gear 17a, a gear 18a integral with the small gear 18, a small gear 19 in mesh with the gear 18a, a zigzag gear 19a integral with the small gear 19, a first ankle 20 in mesh with the gear 18a and a second ankle 21 in mesh with the zigzag gear 19a, and the individual gears are rotatably supported between two plates (not shown) supported by pillars 22a and 22b.

The first wheel 16 is supported by a shaft 16a and has a vertically projecting pin 16b, and it is urged by a clockwise rotation spring 16c to be in forced contact with a pillar 22a. *The gears 17, 18 and 19 are supported by respective shafts 17b, 18b and 19b.*

The first ankle 20 is rotatably mounted by a shaft 20a on an ankle lift lever 23, which is rotatably supported by a pillar 22b, and its operating region is restricted by bent portions 23a and 23b of the ankle lift lever 23.

The second ankle 21 is rotatably supported by a shaft 21a on a switching member 24.

Figure 4:
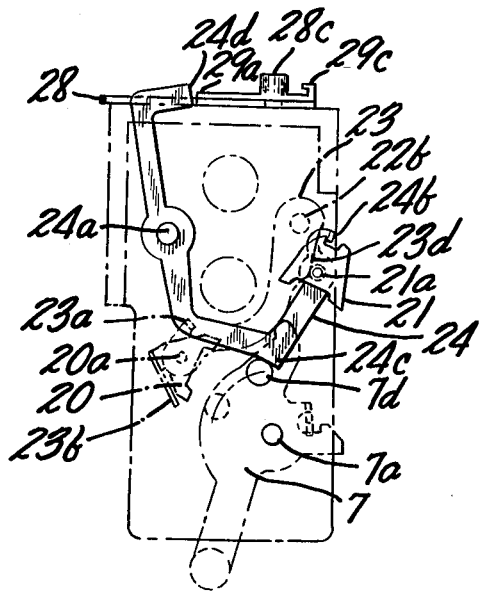
FIGS. 4, 5 and 6 are fragmentary views showing respective parts in the state of FIG. 2.
Figure 5:
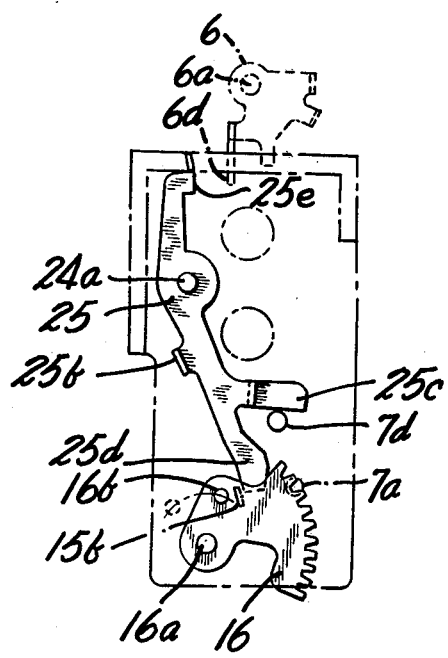

The switching member 24 is rotatably supported by a shaft 24a on the control base plate 1 and is provided with a bent portion 24b for restricting the operating region of the second ankle 21, an urging portion 24a engaging with the pin 7d of the operating member 7 (see FIG. 4) and an engagement arm 24d, and the shaft 21a is acted upon by a spring 23c acting between it and the ankle lift lever 23 so that the second ankle 21 is forced to urge the switching member 24 in the direction for meshing with the zigzag gear 19.

The shaft 21a has its lower stem portion in engagement with a cam portion 23d of the ankle lift lever 23, and the cam portion 23d is formed such that with the pin 7a in the shutter charge portion the first and second ankles 20 and 21 are held raised by the switching member 24 in their respective inoperative positions out of mesh with the associated gear 18a and zigzag gear 19a but with movement of the pin 7a caused in an interlocked relation to the operation of the shutter the first ankle 20 is displaced to an operative position meshing with the gear 18a and then the second ankle 21 is displaced to an inoperative position meshing with the zigzag gear 19a.

A control lever 25 is fitted on a shaft 24a and is biased for clockwise rotation by a spring 25a acting upon its bent portion 25b. It is provided with a bent portion 25c engaging with the pin 7d of the operating member 7, an operating arm 25d engaging with a downwardly extending portion of the pin 16b extending from the first gear 16 and also engaging with the bent portion 15b of the engagement pawl 15, and a lower bent portion 25e engaging with the bent portion 6d of the closing pawl 6.

Figure 6:
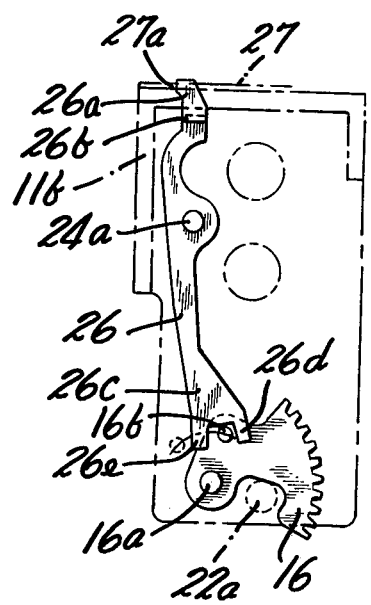

An operating lever 26 is fitted on a further upper portion of the shaft 24a. While the operating arm 26a is shown only by a broken line in FIG. 2, its detailed form is shown in FIG. 6. The operating lever 26 has a bent portion 26b formed in part of the operating arm 26a, and the tip of the other arm 26c is bifurcated into protuberances 26d and 26e engaging the upper protuberance of the pin 16b of the first gear 16.

Figure 3:
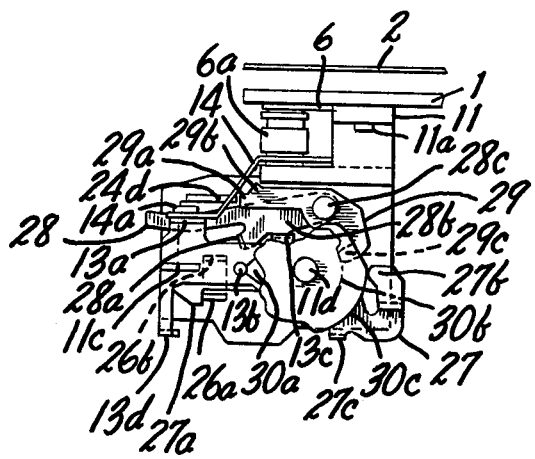
FIG. 3 is an upper side view of the embodiment of FIGS. 1 and 2 in a state with the exposure period set to a the shortest period.

On top of the channel-shaped protuberance of the control base plate 1 are supported individual parts interlocked to a switching dial of the camera for switching the exposure period, and they will now be described with reference to FIGS. 2 and 3.

An operating lever 27 engaging with the operating arm 26a of the operating lever 26 is supported by the protuberance 11c of the control base plate 11 and shaft 11d thereof and is movable in the transverse directions in the Figure, and it is provided with a protuberance 27a engaging with the operating arm 26a, a two-stage bent portion 27b and a bent portion 27c serving as spring hook.

The adjustment lever 13 is supported by the protuberance 11c and shaft 11d in an overlapping relation to the converting lever 27 and is movable in the transverse directions in the Figure and is provided with a bent portion 13a supporting the sulcrum lever 14, an upward protuberance 13a, a downward bent portion 13c and a bent portion 13d serving as spring hook.

A spring not shown is provided between the aforementioned spring hook bent portions 27e and 13b and is biasing the converting lever 27 in the left hand direction and the adjustment lever 13 in the right hand direction.

A bulb lever 28 projects into an operating region of a release button of the camera and is provided with a lower bent portion 28a engaging with the bent portion 26b of the operating lever 26 and a stepped portion 28b engaging with the lower portion of the adjustment lever 13. It is rotatably supported on a shaft 28c and is biased for counterclockwise direction by a spring (not shown). In the illustrated state, the stepped portion 28b is restrained by the bent portion 13c, with the lower bent portion 28a to a position out of engagement with the bent portion 26b of the operating lever 26.

A restraining lever 29 is fitted on the shaft 28c and is provided with two stepped portions 29a and 29b engaging with the engagement arm 24d of the switching member 24 and an operating arm 29c, and it is biased for clockwise rotation by a spring (not shown).

Three cam plates 30a, 30b and 30c are rotatably supported in a mutually integrated state on the shaft 11d. The cam plate 30a engages the upper protuberance 13b of the adjustment lever 13, the second cam plate 30b engages the operating arm 29c of the restraining lever 29, and the third cam plate 30c engages the convex portion provided in the two-stage bent portion 27b of the converting lever 27.

In the illustrated state, the upper protuberance 13b is urged in the leftward direction by the cam plate 30a, with the adjustment lever 13a supporting the fulcrum lever 14 in the most leftward position so that the bent portion 14b is held at a position closest to the operating protuberance 12d of the interlock lever 12. Also, with the action of a clockwise rotation spring (not shown) the operating arm 29c causes the stepped portion 29a to be displaced to the operating region of the engagement arm 24d of the switching member 24. Further, by the third cam plate 30c the convex portion provided on the two-stage bent portion 27b of the converting lever 27 is urged in the rightward direction to cause extension of the spring stretched between the spring hook bent portions 13d and 27c and also cause the protuberance 27a to displace the operating arm 26a of the operating lever 26 in the rightward direction in FIG. 3, thus causing clockwise rotation of the operating lever 26 about the shaft 24a from the state of FIG. 6, while at the same time the pin 16b of the first gear 16 is caused by the protuberance 26d to rotate about the shaft 16a in the counterclockwise direction for displacement to a position out of engagement with the operating arm 25d of the control lever 25, as indicated by the broken line.

Now, the manner of operation in the case when the shutter is released from the above state will be described.

When a camera release button (not shown) is depressed, the release lever 10 is rotated counterclockwise about the shaft 10a against the force of a spring (not shown) to release the engagement bent portion 7b having previously been in engagement with the hook 10b.

When the engagement of the engagement bent portion 7b is released, the operating member 7 is rotated by a counterclockwise rotation spring (not shown) to cause the integral gear portion 7h to rotate the small gear 8b in unison with the gear 8, causing oscillation of the ankle 9 in mesh therewith, whereby counterclockwise rotation of the gear portion 7h and operating member 7 integral therewith are braked.

With the counterclockwise rotation of the operating member 7 the urging portion 24c of the switching member 24 is released by the upwardly projecting pin 7d, whereupon the switching member 24 is rotated about the shaft 24 in the clockwise direction by the spring 23c. However, since the engagement arm 24d is engaged by the stepped portion 29a of the restraining lever 29, the first and second ankles 20 and 21 are held in their respective states out of engagement with the associated gear 18 and zigzag gear 19a. At the same time, the bent arm 25c of the control lever 25, following the pin 7d, is rotated in the clockwise direction about the shaft 24a by the spring 25a, so that the operating arm 25d is brought into engagement with the engagement bent portion 15b of the engagement pawl 15.

In the last portion of operation of the operating member 7, the protuberance 7g thereof pushes the arm 4c of the opening pawl 4 to cause clockwise rotation thereof about the shaft 4a until the engagement of the bent portion 3d of the opening member 3 with the hook 4b is released. The operating member 7 has its charge protuberance 7f brought into engagement with and stopped by the stem of the shaft 10a with the opening pawl 4 in the position after counterclockwise rotation.

Meanwhile, when the engagement of the bent portion 3d is released, clockwise rotation of the opening member 3 about the shaft 3a is caused by a spring (not shown) to operate shutter blade means (not shown), thus opening the opening 1a to start exposure. With the clockwise rotation of the opening member 3 the two-stage protuberance 3b is rotated about the shaft 3a to push the cam arm 12c of the interlock lever 12, causing clockwise rotation of the interlock lever 12 about the shaft 12a, whereby the operating protuberance 12d is brought into engagement with the bent portion 14b of the fulcrum lever 14 and causes the fulcrum lever 14 to rotate about the shaft 14a in the counterclockwise direction. With the operation of the fulcrum lever 14 the arm 14c thereof pushes the bent portion 6c of the closing pawl 6 to cause counterclockwise rotation thereof about the shaft 6a, thus releasing the engagement between the lower bent portion 6b and hook 5c of the closing member 5.

When the engagement of the hook 5c is released, the closing member 5 is rotated by a spring (not shown) about the shaft 5a in the clockwise direction to operate shutter blade means (not shown), thus closing the opening 1a to bring an end to the exposure.

In the last stage of rotation of the closing member 3 the two-stage protuberance 3b is brought into engagement with the arm 15a of the engagement pawl 15, causing counterclockwise rotation of the engagement pawl 15 about the shaft 7a to release the engagement of the operating arm 25d of the control lever 25 with the engagement bent portion 15b.

When the engagement of the operating arm 25d is released, the control lever 25 is rotated by the spring 25a about the shaft 24a in the clockwise direction. At this time, free operation without restraint is obtained since the pin 16b of the first gear 16 is retreated from the operative region of the operating arm 25d, so that the lower bent portion 25e is brought into engagement with the bent portion 6d of the closing pawl 6. However, since the closing pawl 6 has already been operated by the interlock lever 12, the closing pawl 6 is pushed after the operation of the closing member 5. Thereafter, the bent portion 25b is brought into engagement with one side of the channel-shaped protuberance of the control base plate 11, whereupon the control lever 25 is stopped.

After the engagement pawl 15 is operated by the two-stage protuberance 3b, the bent portion 3c of the opening member 3 is locked by the hook 7e of the operating member 7, thus preventing backlash at the halt position.

After the shutter blade means is brought by the opening member 3 to an opening stop position, the operating arm 25d is released from engagement with the bent portion 15b of the engagement pawl 15. As the engagement bent portion 15b escapes from the operating arm 25d, the control lever 25 gives reaction force to the bent portion 15b, thus causing further counterclockwise rotation of the engagement pawl 15 about the shaft 7a.

As a result, the contact arm 15a of the engagement pawl 15 is brought into contact with an insulated contact piece (not shown) to cause conduction of a terminal connected to a flash means. After conduction of the terminal of the flash means is brought about by the contact arm 15c, clockwise rotation of the engagement pawl 15 is caused by a spring (not shown), whereby the arm 15a is brought into contact with the two-stage protuberance 3b and is stopped after breaking contact with the afore-mentioned contact piece.

To charge the shutter again, the charge protuberance 7f of the operating member 7 is rotated in the clockwise direction about the shaft 7a, and while oscillating the zigzag wheel 8 and ankle 9 with the gear portion 7h the two-stage protuberance 3b of the opening member 3 is pushed with the cam portion 7c, causing counterclockwise rotation of the opening member 3 about the shaft 3a to bring the shutter blade means (not shown) to the charge position while also charging a spring (not shown).

Simultaneously with the counterclockwise rotation of the opening member 3 the cam portion 3e pushes the upper protuberance 5b of the closing member 5 to cause counterclockwise rotation thereof about the shaft 5a, thus bringing the shutter blade means (not shown) to the charge position while also charging a spring (not shown).

With the clockwise rotation of the operating member 7, a spring (not shown) for the operating member is charged, while at the same time the bent portion 25c of the control lever 25 is pushed by the upwardly projecting pin 7d, whereby the control lever 25 charges the spring 25a while the operating arm 25d is also rotated in the counterclockwise direction to a position of engagement with the engagement bent portion 15 of the engagement pawl 15.

At the same time, the urging portion 24c of the switching member 24 is pushed by the pin 7d, causing counterclockwise rotation of the member 24 to separate the engagement arm 24d from the stepped portion 29a of the restraining lever 29.

When the charge position is reached by the operating member 7 the engagement bent portion 7b is engaged by the hook 10b of the release lever 10, the bent portion 3d of the opening member 3 is engaged by the hook 4 of the opening pawl 4, and further the hook 5c of the closing member 5 is engaged by the bent portion 6b of the closing pawl 6, so that the state of FIGS. 1 and 2 is obtained.

In the above operation the fulcrum lever 14 is supported at its most leftward position, so that the exposure period is controlled to the shortest period (for instance 1/1,000 second). By subsequently operating the exposure period select dial of the camera to cause counterclockwise rotation of the cam plates 30a, 30b and 30c about the shaft 11d, the upper protuberance 13b of the adjustment lever 13 is caused by the cam plate 30a to be displaced in the rightward direction by the spring stretched by the spring hook bent portion 3d, thus pushing the fulcrum lever 14 in the rightward direction from the state of FIG. 1.

As the fulcrum lever 14 is pushed in the rightward direction, the bent portion 14b and arm 14c of the lever 14 act to change the relative operative phases of the operating protuberance 12d of the interlock lever 12 and bent portion 6c of the closing pawl 6, whereby the two-stage protuberance 3b of the opening member 3 operates, in a further rotated position, the closing pawl 6 via the interlock lever 12 and fulcrum lever 14, that is, the exposure period is controlled to progressively longer periods (for instance, 1/500 sec., 1/250 sec., etc.). At this time, the cam plates 30b and 30c hold the restraining lever 29 and converting lever 27 in the respective inoperative positions with respect to the respective switching member 24 and operating lever 26 in the manner as described above.

With further counterclockwise rotation of the cam plates 30a, 30b and 30c the fulcrum lever 14 reaches a position, at which the closing pawl 6 is not operated even with the rotation of the interlock lever 12.

At this time, the closing pawl 6 has no bearing upon the interlock lever 12, and when the shutter blade means is displaced by the opening member 3 to the open position in the opening 1a the two-stage protuberance 3b causes counterclockwise rotation of the engagement pawl 15 about the shaft 7a to release engagement of the operating arm 25b by the engagement bent portion 15b, thus causing clockwise rotation of the control lever 25 about the shaft 24a to cause the bent portion 6d of the closing pawl 6 to be pushed in the rightward direction by the lower bent portion 25e so as to release the closing member 5 for bringing an end to the exposure. The exposure period at this time is further extended by another step, for instance 1/125 sec.

With further counterclockwise rotation of the cam plates 30a, 30b and 30c, the cam plates 30a comes to hold the fulcrum lever 14 at a position corresponding to 1/125 sec., the cam plate 30b comes to hold the stepped portion 29a of the restraining lever 29 at a position out of mesh with the first and second ankles 20 and 21, and the cam plate 30c causes the converting lever 27 to be moved in the clockwise direction by the spring biasing the spring hook bent portion 27c as it is followed by the convex portion of the two-stage bent portion 27b, thus releasing the restraint of the operating arm 26a by the protuberance 27a, whereby the operating lever 26 is rotated about the shaft 24a in the counterclockwise direction as it is urged by the pin 16b biased by the spring 16c of the first gear 16.

The position of the first gear pin 16b is also regulated in correspondence to the cam plate 30c, and upon shutter release the rotation of the operating arm 25d of the control lever 25 is controlled to control the exposure period to, for instance, 1/60 second.

When the cam plates 30a, 30b and 30c are further rotated in the counterclockwise direction, the cam 30b causes counterclockwise rotation of the stepped portion 29b of the restraining lever 29 to a position corresponding to the engagement arm 24d of the switching member 24 without movement of the adjustment lever 13 and fulcrum lever 14. If the shutter is released in this state, clockwise rotation of the opening member 3 is caused to start exposure. When the control lever 25 is released in the last stage of this operation, the operating arm 25d comes to engage the pin 16b of the first gear 16 and control rotation. However, since the switching member 24 follows the pin 7d of the operating member 7 and executes clockwise rotation up to a position at which the engagement arm 24d is engaged by the stepped portion 29b of the restraining lever 29, the cam portion 23d is released from the shaft 21a, whereby the ankle lift lever 23 is rotated by the spring 23c about the pillar 22b in the counterclockwise direction, with the first ankle 20 in mesh with the gear 18a. The exposure period at this time corresponds to a period, to which the position of the pin 16b of the first gear 16 is regulated in correspondence to the cam plate 30c; for instance the control lever 25 is controlled for controlling the exposure period to 1/30 sec., 1/15 sec., ⅛ sec., etc., and with operation of the closing pawl 6 caused by the bent portion 25e an end is brought to the exposure.

With still further counterclockwise rotation of the cam plates 30a, 30b and 30c, the cam plate 30b causes counterclockwise rotation of the restraining lever 29 about the shaft 28c to a position at which its stepped portions 29a and 29b are out of engagement with the engagement arm 24d without movement of the adjustment lever 13 and fulcrum lever 14.

When the shutter is released in this state, counterclockwise rotation of the operating member 7 is caused and followed by the pin 7d, causing rotation of the urging portion 24c of the switching member 24 to cause rotation of the first and second ankles 20 and 21 to respective positions in mesh with the respectively associated gear 18 and zigzag gear 19a and also rotation of the ankle lift lever 23 and switching member 24 by the spring 23c. With further rotation of the operating member 7 to release the opening member 5 and operate the engagement pawl 15 in the last stage of operation of the opening member 3 so as to release the control lever 25, the operating arm 25d is brought into engagement with the pin 16b, causing rotation of the gear train and oscillation of the first and second ankles, whereby the position of the pin 16b is regulated by the converting lever 27 corresponding to the cam plate 30c and the operating lever 26. Thus, the control lever 25 is controlled to control the exposure period to, for instance ¼ sec., ½ sec., 1 sec., etc., and with operation of the closing pawl 6 caused by the bent portion 25e the closing member 5 is released to bring an end to the exposure.

In order for the exposure to be effected during the depressed state of the camera release button and for the bulb operation of closing the shutter to be effected by releasing the button, the cam plates 30a, 30b and 30c are further rotated in the counterclockwise direction, so that the cam plate 30a permits movement of the upper protuberance 13b, causing further rightward movement of the fulcrum lever 14. Thus, since the operating protuberance 12d and bent portion 6c are held independently of each other and the lower bent portion 13c of the adjustment lever 13 escapes from the stepped portion 28b of the bulb lever 28 and is moved in the rightward direction, the bulb lever 28 is rotated in the counterclockwise direction about the shaft 28c by a spring (not shown) to follow and be brought into contact with the release button of the camera (not shown). Also, the cam plates 30b and 30c hold the respective restraining lever 29 and converting lever 27 in the respective state not engaging the engagement arm 24d and not operating the operating arm 26a.

When the camera release button is depressed in this state, the bulb lever 28, following this, is rotated in the counterclockwise direction, whereby the lower bent portion 28a is introduced into the operative region of the bent portion 26b of the operating lever 26. When the release button is further lowered to cause clockwise rotation of the release lever 10, counterclockwise rotation of the operating member 7 is caused and followed by the switching member 24, causing the displacement of the first and second ankles 20 and 21 to the respective operative positions and release of the opening member 3 to start exposure. The control lever 25 is subsequently released, and as the operating arm 25d is depressed by the pin 16b the control lever 25 is rotated in the clockwise direction. When the pin 16b engages the protuberance 26e of the operating lever 26, it locks the control lever 25 in that position since the bent portion 26b is engaged by the bent portion 28a of the bulb lever 28. By releasing the release button, the bulb lever 28 is rotated in the clockwise direction against a spring (not shown) to release the engagement between the lower bent portion 28a and bent portion 26b, whereby clockwise rotation of the operating lever 26 is caused by the operating arm 25d of the control lever 25 as the urging protuberance 26e is urged by the spring 25a via the pin 16b. At this time, the bent portion 6d of the closing pawl 6 is pushed by the bent portion 25e of the control lever 25, whereby the engagement of the closing member 5 is released by the bent portion 6b to bring an end to the exposure.

It is possible to arrange such that during the above operation of the bulb the cam plate 30b causes the restraining lever 29 to bring the stepped portion 29b and engagement arm 24d into engagement with each other so that only the first ankle is oscillated.

Also, while in the above embodiment the first ankle 20 and second ankle 21 are adapted to be engaged and disengaged, it is also possible to arrange such that part of the gear train is separated for engagement or disengagement or such that part of the gear train is switched to change the rotation ratio for engagement and disengagement of some gears, and no limitation is imposed upon the member which is engaged or disengaged.

Referring to the drawings, a cam plate (30) is engaged with the operating unit by a simple means as it is provided on a U-shaped projection of a control unit base plate (11) arranged vertically against the plane of motion of a governer means such as a first wheel (16) and ankle pieces (20) and (21), and control means such as an interlocking lever (12) and a control lever (25). The cam plate (30) is turned directly by the setting dial on the upper face of the body of a camera or indirectly through a gear train connecting between the cam plate (30) and the setting dial.

It will be well understood that the shutter unit according to this invention is extremely simplified, easily assembled and adjusted and also manufactured at reduced cost compared with the conventional shutter unit of the type wherein the cam plate is provided in a plane parallel to the plane of motion of the governer means and interlocked with the operating unit on the upper face of the body of the camera by means of a crown gear or string.

We claim:

1. An exposure time setting device for the shutter of a camera having an exposure time setting dial movable in an operating plane and disposed at an upper surface of the camera comprising: an opening member for opening the aperture to initiate an exposure; a closing member for closing the aperture to complete the exposure; an opening hook and a closing hook for detaining said opening member and said closing member, respectively, at the charged position; actuatable control means movable in a given plane perpendicular to the operating plane for releasing said opening hook and said closing hook; a shutter release member for successively actuating the control means; governor means for delaying operation of said control means and movable in the given plane; and an exposure time setting cam for adjusting said governor means, said exposure time setting cam movable in response to movement of the dial, within a plane parallel to the exposure time setting dial operating plane and perpendicular to the given plane within which said control means and said governor means operate.

2. In a camera having a shutter, an exposure time setting dial disposed on an upper surface of the camera and movable in an operating plane for setting exposure time for the shutter, and an exposure time setting device for effecting the exposure time for the shutter in response to the dial position in the operating plane, the improvement wherein the device comprises: control means movable in a given plane perpendicular to the operating plane for opening and closing the shutter; governor means movable in the given plane for delaying operation of the control means; and an exposure time setting cam movable, in response to movement of the dial, within a plane parallel to the operating plane and perpendicular to said given plane.

3. The device according to claim 2, wherein the cam comprises three integral cam plates rotatably supported for rotation parallel to said operating plane.

* * * * *